United States Patent
Kamil et al.

(10) Patent No.: US 11,520,017 B2
(45) Date of Patent: Dec. 6, 2022

(54) LIDAR DEVICE HAVING AN INCREASED SCANNING FREQUENCY AND METHOD FOR SCANNING A REGION TO BE SCANNED

(71) Applicant: Robert Bosch GmbH, Stuttgart (DE)

(72) Inventors: Mustafa Kamil, Leonberg (DE); Nico Heussner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 519 days.

(21) Appl. No.: 16/615,447

(22) PCT Filed: May 15, 2018

(86) PCT No.: PCT/EP2018/062436
§ 371 (c)(1),
(2) Date: Nov. 21, 2019

(87) PCT Pub. No.: WO2018/215232
PCT Pub. Date: Nov. 29, 2018

(65) Prior Publication Data
US 2020/0103506 A1    Apr. 2, 2020

(30) Foreign Application Priority Data
May 23, 2017    (DE) ...................... 10 2017 208 736.6

(51) Int. Cl.
*H04B 10/00*    (2013.01)
*G01S 7/481*    (2006.01)
*G01S 7/484*    (2006.01)

(52) U.S. Cl.
CPC ............ *G01S 7/4817* (2013.01); *G01S 7/484* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 8,681,319 B2 *   3/2014   Tanaka ..................... G01S 17/42
                                                          356/3.01
8,917,432 B2    12/2014   Wack et al.
(Continued)

FOREIGN PATENT DOCUMENTS

DE    102006040858 A1    5/2007
DE    102013012789 A1    2/2015
(Continued)

OTHER PUBLICATIONS

International Search Report for PCT/EP2018/062436, dated Aug. 17, 2018.

*Primary Examiner* — Hanh Phan
(74) *Attorney, Agent, or Firm* — Norton Rose Fulbright US LLP; Gerard Messina

(57) ABSTRACT

A lidar device for scanning a region to be scanned, using at least one beam, including at least one radiation source for generating the at least one beam, and at least two mirrors rotatable about an axis of rotation, in order to deflect beams reflected by an object, onto a detector oriented perpendicularly to the axis of rotation; the at least two mirrors having, in each instance, a reflectivity for a wavelength range and being connectable to each other at an angle, in a region of the axis of rotation. A method for scanning a region to be scanned, using a lidar device, is also described.

10 Claims, 3 Drawing Sheets

(58) Field of Classification Search
CPC ... H04B 10/1149; H04B 10/40; G01S 7/4817; G01S 17/42; G01S 17/08; G01S 17/89; G01S 7/484; G01S 7/4816; G01S 17/10; G01S 7/4812
USPC ....... 398/169, 170, 118, 119, 127, 128, 129, 398/130, 131, 135, 136, 158, 159, 172; 356/4.01, 5.01, 3.01, 4.1
See application file for complete search history.

(56) References Cited

U.S. PATENT DOCUMENTS

| | | | |
|---|---|---|---|
| 11,022,688 B2* | 6/2021 | Eichenholz | ........ G02B 27/0977 |
| 2006/0139915 A1 | 6/2006 | Chiaretti | |
| 2017/0082733 A1 | 3/2017 | Schwarz | |

FOREIGN PATENT DOCUMENTS

| | | |
|---|---|---|
| DE | 102015217910 A1 | 3/2017 |
| EP | 2447666 A2 | 5/2012 |
| JP | S62242910 A | 10/1987 |
| JP | 2004348070 A | 12/2004 |
| JP | 2012117996 A | 6/2012 |
| JP | 2013205095 A | 10/2013 |
| WO | 9722976 | 6/1997 |
| WO | 2012040749 A1 | 4/2012 |

* cited by examiner

LIDAR DEVICE HAVING AN INCREASED SCANNING FREQUENCY AND METHOD FOR SCANNING A REGION TO BE SCANNED

FIELD OF THE INVENTION

The present invention relates to a lidar device for scanning a region to be scanned, using at least one beam, as well as to a method for scanning a region to be scanned, using a lidar device.

BACKGROUND INFORMATION

Current lidar (light detection and ranging) devices use a laser or a radiation source for generating a beam, which is subsequently deflected by a deflection unit for the controlled scanning of a region to be scanned. A deflection unit may be constructed in the form of a plurality of rotatable mirrors, which successively deflect the beams emitted onto the mirrors in a direction of a region to be scanned. In this connection, the radiation source is normally positioned perpendicularly to the axis of rotation of the mirrors. If objects are situated in the region to be scanned, the deflected beams may be reflected or scattered by the objects, back to the lidar device. The reflected beams may be deflected by the mirrors to a detector, and the resulting measurement data may be evaluated subsequently. In this context, both the radiation source and the detector may be positioned in a stationary mount. In order to increase a scanning frequency of the region to be scanned, for example, more rotatable mirrors may be used, or the mirrors may be rotated at a higher speed of rotation. However, to allow a higher speed of rotation, more powerful and, therefore, larger drive motors must be used. In the case of using additional mirrors, the mirrors may obstruct each other. This results in an increasingly smaller region to be scanned, as the number of rotating mirrors increases.

SUMMARY OF THE INVENTION

The object of the present invention is to provide a lidar device having an increased scanning frequency with the same dimensions, as well as a method for operating such a lidar device.

This object may be achieved with the aid of the respective subject matter of the independent claims. Advantageous refinements of the present invention are the subject matter of respective dependent claims.

According to one aspect of the present invention, a lidar device for scanning a region to be scanned, using at least one beam, is provided. The lidar device includes at least one radiation source for generating the at least one beam. In addition, the lidar device includes at least two mirrors rotatable about an axis of rotation, for deflecting beams reflected by an object onto a detector oriented perpendicularly to the axis of rotation of the mirrors. According to the present invention, the at least two mirrors have, in each instance, a reflectivity for a wavelength range and are connectable to each other at an angle, in a region of the axis of rotation.

In the case of equal space and/or the same dimensions, in order that a lidar device possess a higher scanning frequency without a loss of receiving capacity, the reflection of mirrors, which are not used at the very moment for reflecting beams, may not hinder the detection. This may be achieved, in particular, by mirrors, which are able to reflect beams having a wavelength within a specific wavelength range. On the other hand, beams having a wavelength, which is outside of the specific wavelength range, are transmitted by at least one mirror. Such wavelength-specific mirrors have, in addition, a dependence of the wavelength range on an angle of incidence of a beam onto the mirror. Beams may be reflected by at least one mirror or be transmitted by at least one mirror as a function of the angular position of the at least two mirrors. The wavelength range of each mirror may be set in such a manner, that the individual mirrors do not impede each other and/or do not shade each other. In this manner, it is possible to use a plurality of mirrors to increase the scanning frequency. The space utilized and the rotational speed of the mirrors may remain unchanged. Consequently, a scanning frequency of the lidar device that is N times higher may be attained, where N=the number of reflecting surfaces. Besides the increase in the scanning frequency, this may be used, in particular, for digital detector principles, in which a histogram may be generated via pulse detection, as, for example, in the case of SPAD (single photon avalanche diode) detectors.

According to one advantageous exemplary embodiment of the lidar device, the at least two mirrors are Bragg mirrors. In each instance, Bragg mirrors are reflective for only a particular angular range. If a beam scattered back and/or reflected by an object strikes a mirror at a particular angle, the Bragg mirror reflects this light onto the detector. Reflected beams are reflected, for example, perpendicularly to the axis of rotation of the mirrors. If, for example, reflected beams strike at least one Bragg mirror at a different angle, then the reflected beam is transmitted and may strike the mirror surface, which is, at the very moment, at a "correct" angle, in order to be able to reflect the reflected beam onto the detector. Due to the relatively limited wavelength range of a Bragg mirror, an additional filter introduced in series to and before the detector may be omitted, since a majority of the interfering light may not be reflected by any of the Bragg mirrors onto the detector.

According to a further exemplary embodiment of the lidar device, the at least two mirrors reflect incident beams alternately onto the detector. Through this, the rotatable mirrors may be rotated unidirectionally at a specific speed of rotation. Therefore, it is not necessary to change a direction of angular motion of the mirrors.

According to a further exemplary embodiment of the lidar device, each mirror has an active angular range about the axis of rotation. Within the active angular range, incoming beams may be reflected onto the detector. Based on the dependence of the wavelength range of the mirrors on an angle of incidence of a beam, only beams having a certain wavelength, at a specific angle of incidence, or at a specific range of angle of incidence, may be reflected by a mirror in a first step and reflected at such an angle in a second step, so that the beam strikes the detector. This results in an angular range of a mirror, within which beams having a particular wavelength may be deflected or reflected onto the detector. Therefore, it is possible to assign a filtering function to the mirrors and to reduce or mask out interfering light.

According to a further exemplary embodiment of the lidar device, outside of the active angular range, each mirror transmits incident beams onto at least one other mirror. In the case of a detector oriented perpendicularly to the axis of rotation of the mirrors, when there are a plurality of mirrors, there are always angles of rotation of the mirrors, at which the mirrors partially overlap and consequently may not reflect a portion of the beams to the detector. If beams strike a mirror of the present invention, which has an angle outside of the active angular range of the specific mirror, then the beams are transmitted by the mirror. Through this, a plurality of mirrors may not shade each other. Then, beams are only reflected, if they are able to strike the detector, as well.

According to a further exemplary embodiment of the lidar device, the at least one radiation source is oriented perpendicularly to the axis of rotation, in which case the at least one generated beam is deflectable via the at least two mirrors, in order to scan the region to be scanned. Therefore, not only may beams reflected by objects be deflected to the detector, but the beams generated by the at least one radiation source may also be emitted by the lidar device into the region to be scanned. Consequently, at the same time, the lidar device may also transmit beams generated and receive beams reflected and/or beams scattered back to the lidar device.

According to a further exemplary embodiment of the lidar device, the at least two mirrors have, on both sides, a reflectivity for, in each instance, one wavelength range. In particular, the rotatable mirrors constructed as Bragg mirrors may be used on both sides. This may produce a doubling of the scanning frequency of the lidar device. Reflectivity of the mirrors on both sides may be implemented, for example, in the form of a coating.

According to a further exemplary embodiment of the lidar device, at least two radiation sources are usable for generating at least two beams having different wavelengths. Since the active angular ranges for, e.g., two mirrors positioned one after the other may overlap or even be identical, it is advantageous to use a plurality of radiation sources, which may generate beams having different wavelengths. Thus, mirrors having different, active angular ranges and/or wavelength ranges may be rotationally mounted in an alternating manner. The specific mirrors may reflect the beams adapted to the mirrors, in the direction of the region to be scanned.

According to a further exemplary embodiment of the lidar device, the at least two beams may be generated sequentially by the at least two radiation sources. Thus, beams, which have different wavelengths and are adapted to the utilized, rotatable mirrors, are generated one after the other in an alternating manner. The alternating pulse sequence may allow the specific reflection ranges of the utilized mirrors to be used in an optimum manner. If the beams generated have been reflected back to the lidar device by an object, these reflected beams may be recorded by the detector and, due to the differing wavelengths, may be evaluated in a technically simpler manner. Through this, the specific wavelength ranges of the mirrors suitable for reflecting may also be clearly distinguished during an evaluation of detector data.

According to a further exemplary embodiment of the lidar device, the detector has a spectral detection range, which corresponds to at least the wavelength ranges of the at least two mirrors. In order to ensure complete separation of the reflection ranges or the wavelength ranges of the mirrors, the necessary spectral detection range may increase with the number of mirror surfaces and/or corresponding wavelengths. In this manner, it may be ensured that the detector is able to completely record all of the beams deflected onto it.

According to a further aspect of the present invention, a method for scanning solid angles, using a lidar device according to the preceding aspect of the present invention, is provided. In a first step, at least one beam is generated. The at least one beam is used for scanning a solid angle. At least one beam reflected by an object is guided onto a detector by at least two mirrors rotatable about an axis of rotation; as a function of an angular position of the at least two mirrors; reflected beams being transmitted by a first mirror onto at least one second mirror and being reflected onto the detector by the at least one second mirror, or the reflected beams being reflected onto the detector by the first mirror.

If an object is positioned in the region to be scanned, the beams generated and the generated beams transmitted into the region to be scanned may be reflected by the object. In this connection, the rotating mirrors may receive the reflected beams and deflect them onto the detector. The mirrors may have a wavelength-specific reflectivity and/or a reflectivity specific to an angle of incidence. Thus, for example, beams may only then be reflected by the mirrors, if the beams have a particular wavelength and strike the mirror at a specific angle of incidence. In this connection, the reflectivity may be present within a range of angles of incidence and/or wavelengths. If, for example, an incident beam has optical characteristics, which are outside of the specifications of the respective mirror, then this beam is not reflected. For example, this may prevent reflected beams from missing the detector or interfering reflections from being guided onto the detector. Consequently, the rotating mirrors may replace a filter. A reflected beam, which is not reflected by a first mirror, may be transmitted unhindered by the first mirror onto a further mirror situated in an optical path of the reflected beam. The further mirror may be oriented relative to the detector in such a manner, that the transmitted beam may be deflected to the detector. In particular, this may prevent mirrors from being able to shade or obstruct each other. In the case of a higher number of rotatable mirrors for increasing a scanning frequency, the region to be scanned may also be illuminated without limitation. Due to this measure, the dimensions of such a lidar device may remain constant in spite of the use of a plurality of mirrors.

In the following, exemplary embodiments of the present invention are explained in greater detail in light of highly simplified, schematic representations.

In the figures, identical structural elements have, in each instance, the same reference numerals.

DETAILED DESCRIPTION

Figure 1:
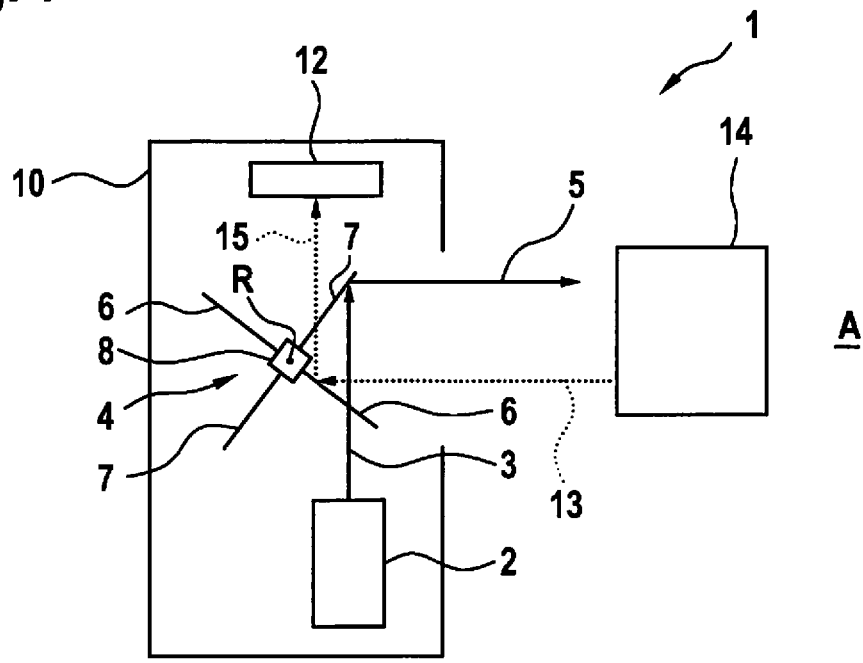
FIG. 1 shows a schematic representation of a lidar device according to a first exemplary embodiment.

FIG. 1 shows a schematic representation of a lidar device 1 according to a first exemplary embodiment. Lidar device 1 includes a radiation source 2, which is implemented as an infrared laser 2. Radiation source 2 generates pulsed beams 3, which are emitted perpendicularly in the direction of an axis of rotation R of a deflection unit 4.

According to the exemplary embodiment, deflection unit 4 is made up of four Bragg mirrors 6, 7, which are interconnected indirectly at a drive shaft 8 in an axially symmetric manner, in the region of axis of rotation R. For example, mirrors 6, 7 may each include a bilateral coating made up of a plurality of λ/2 regions having alternating, different indices of refraction. In this connection, λ corresponds to a wavelength of a specific beam 3 generated. Starting out from the coating of Bragg mirrors 6, 7, only incoming beams 3 at a particular angle of incidence α and having a particular wavelength λ may be reflected by Bragg mirrors 7 in such a manner, that reflected beams 5 are formed by constructive interference and may be emitted from a housing 10 of lidar device 1, in the direction of a region A to be scanned. If angle of incidence α or wavelength λ of a beam 3 deviates from a wavelength range of the coating and/or of Bragg mirrors 6, then mirrors 6 for beams 3 are transparent with respect to incident beams 3. Consequently, beams 3 may strike a mirror 7 downstream from the mirror 6 transparent to beams 3 and be reflected by this mirror 7 in the direction of region A to be scanned. Deflection unit 4 rotates at a specific rotational speed about axis of rotation R. In this manner, lidar device 1 may illuminate or scan region A to be scanned, using reflected beams 5.

Conversely, deflection unit 4 is not only able to transmit generated beams 3 out of lidar device 1, but also able to receive incoming beams 13 and to guide received beams 15 onto a detector 12. In this connection, the beams 13 coming in and/or reflected by an object 14 are formed as reflections or scattered light of the beams 5 emitted from lidar device 1. Due to the coating of mirrors 6, 7 on both sides, reflected beams 13 may be transmitted by mirrors 6, 7 or be reflected by mirrors 6, 7 to detector 12 as a function of the angular position of deflection unit 4 and/or of respective mirrors 6, 7. In this connection, mirrors 6, 7 may be used as a filter, since unwanted, scattered light does not satisfy the criteria for reflection by mirrors 6, 7.

In this connection, the beams 3, 13 coming in in the direction of deflection unit 4 may also be successively transmitted by a plurality of mirrors 6, 7, until the criteria for reflection are satisfied. Consequently, a number of mirrors 6, 7 may be increased, in order to allow a higher scanning frequency of region A to be scanned, while the speed of rotation remains constant.

Figure 2:
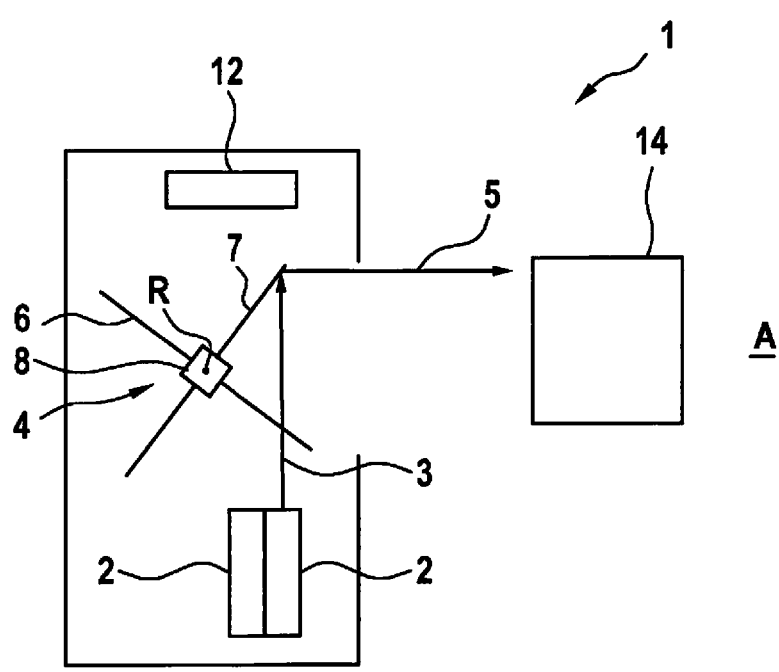
FIG. 2 shows a schematic representation of a lidar device according to a second exemplary embodiment.

A schematic representation of a lidar device 1 according to a second exemplary embodiment is in FIG. 2. In contrast to the first exemplary embodiment, lidar device 1 includes two radiation sources 2, which alternately generate beams 3 in succession and emit them in the direction of deflection unit 4. Through this, variably coated mirrors 6, 7 may be illuminated by beams 3 having, in each instance, wavelengths A adapted to mirrors 6, 7. Therefore, depending on angle of rotation B of deflection unit 4, mirrors 6, 7 coated on both sides may also transmit beams 3 having suitable wavelengths A. Through this, different radiation sources 2 may be controlled as a function of angle of rotation S, in order to be able to illuminate region A to be scanned, using beams 5.

Figure 3:
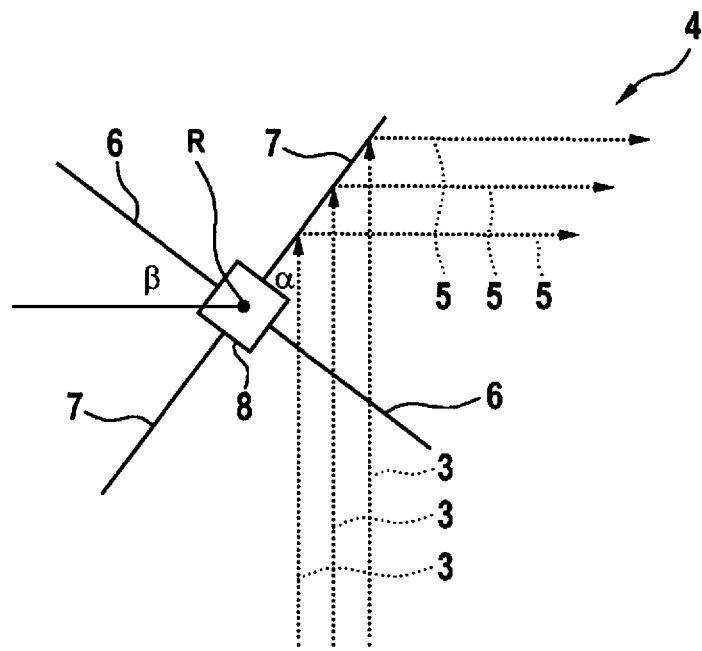
FIG. 3 shows a schematic representation of rotatable mirrors of a lidar device according to a third exemplary embodiment.

FIG. 3 shows a schematic representation of rotatable mirrors 6, 7 of a lidar device 1 according to a third exemplary embodiment. Here, utilized mirrors 6, 7 of deflection unit 4 have one-sided, wavelength-specific reflectivity.

Figure 4:
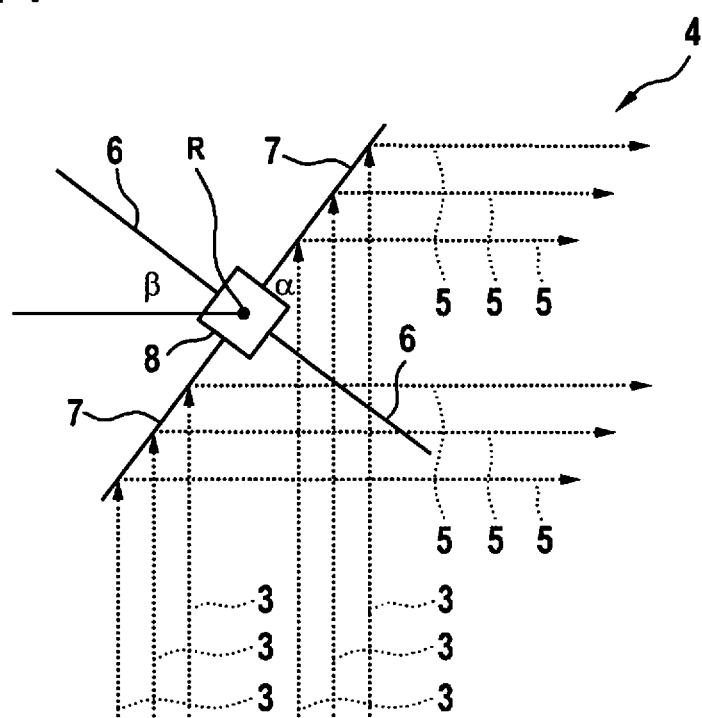
FIG. 4 shows a schematic representation of rotatable mirrors of the lidar device according to the first exemplary embodiment.

A schematic representation of rotatable mirrors 6, 7 of lidar device 1 according to the first exemplary embodiment is shown in FIG. 4. It is clearly shown that the beams 3 generated may also illuminate a plurality of mirrors 7 simultaneously, and that therefore, for example, a plurality of beams 5 reflected in the direction of region A to be scanned may be emitted simultaneously and/or that beams 5 may be emitted in the form of a line. The mirrors 6 positioned in the optical path of generated beams 3 and of reflected beams 5 are passed through without loss, since the conditions for reflection are not satisfied.

Figure 5A:
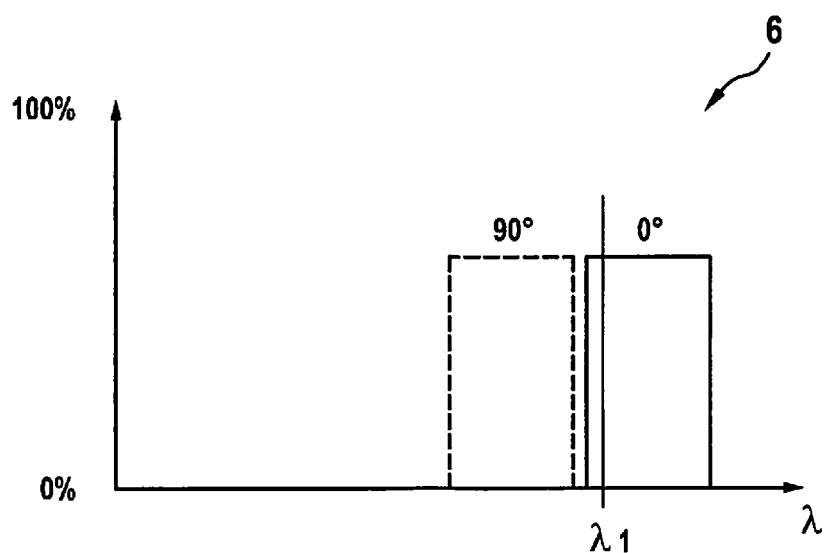
FIG. 5a shows a schematic representation of reflectivities of the rotatable mirrors as a function of wavelengths.
Figure 5B:
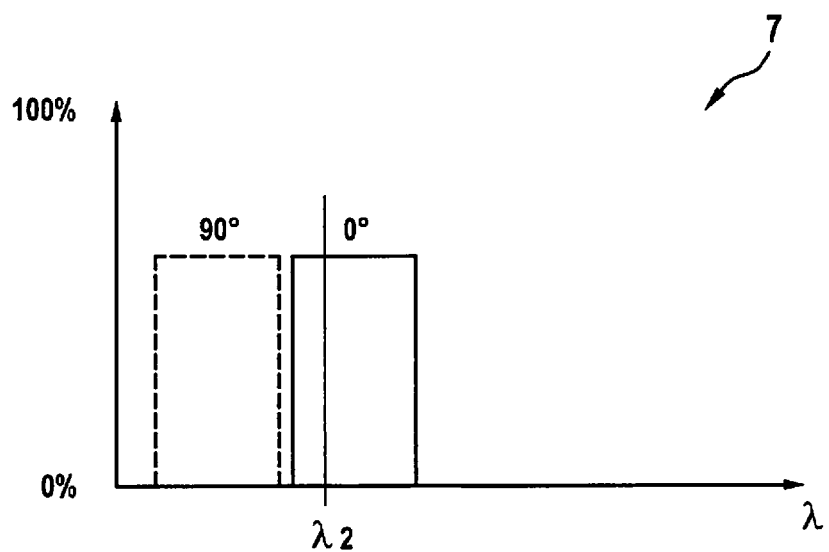
FIG. 5b shows another schematic representation of reflectivities of the rotatable mirrors as a function of wavelengths.

FIGS. 5a and 5b schematically show graphs, which set forth the reflectivities of specific, rotatable mirrors 6, 7 in percent as a function of wavelengths λ. These may be, for example, mirrors 6, 7 of a lidar device 1 according to the first exemplary embodiment. In particular, shifts in the wavelength ranges at different angles of incidence α of beams 3 on mirrors 6, 7 are shown clearly. For the sake of simplicity, only angles of incidence α of 0° and 90° are shown.

What is claimed is:

1. A lidar device for scanning a region to be scanned, using at least one beam, comprising:
   at least one radiation source for generating the at least one beam;
   at least two mirrors rotatable about an axis of rotation to deflect beams reflected by an object onto a detector oriented perpendicularly to the axis of rotation;
   wherein the at least two mirrors have, in each instance, a reflectivity for a wavelength range and are connectable to each other at an angle, in a region of the axis of rotation; and
   wherein the at least two mirrors include Bragg mirrors.

2. The lidar device of claim 1, wherein the at least two mirrors alternately reflect incident beams onto the detector.

3. The lidar device of claim 1, wherein each mirror has an active angular range about the axis of rotation, and within the active angular range, incident beams are reflectable onto the detector.

4. A lidar device for scanning a region to be scanned, using at least one beam, comprising:
   at least one radiation source for generating the at least one beam;
   at least two mirrors rotatable about an axis of rotation to deflect beams reflected by an object onto a detector oriented perpendicularly to the axis of rotation;
   wherein the at least two mirrors have, in each instance, a reflectivity for a wavelength range and are connectable to each other at an angle, in a region of the axis of rotation;
   wherein each mirror has an active angular range about the axis of rotation, and within the active angular range, incident beams are reflectable onto the detector; and
   wherein outside of the active angular range, each mirror transmits incident beams onto at least one further mirror.

5. The lidar device of claim 4, wherein the at least one radiation source is oriented perpendicularly to the axis of rotation, and the at least one beam generated is deflectable via the at least two mirrors to scan the region to be scanned.

6. A lidar device for scanning a region to be scanned, using at least one beam, comprising:
   at least one radiation source for generating the at least one beam;
   at least two mirrors rotatable about an axis of rotation to deflect beams reflected by an object onto a detector oriented perpendicularly to the axis of rotation;
   wherein the at least two mirrors have, in each instance, a reflectivity for a wavelength range and are connectable to each other at an angle, in a region of the axis of rotation; and wherein the at least two mirrors have a reflectivity on both sides for, in each instance, one wavelength range.

7. The lidar device of claim 6, wherein at least two radiation sources are for generating at least two beams having different wavelengths.

8. A lidar device for scanning a region to be scanned, using at least one beam, comprising:
   at least one radiation source for generating the at least one beam;
   at least two mirrors rotatable about an axis of rotation to deflect beams reflected by an object onto a detector oriented perpendicularly to the axis of rotation;
wherein the at least two mirrors have, in each instance, a reflectivity for a wavelength range and are connectable to each other at an angle, in a region of the axis of rotation;
   wherein at least two radiation sources are for generating at least two beams having different wavelengths; and
   wherein the at least two beams are generatable sequentially by the at least two radiation sources.

9. The lidar device of claim 8, wherein the detector has a spectral detection range, which corresponds to at least the wavelength ranges of the at least two mirrors.

10. A method for scanning regions to be scanned using at least one beam, using a lidar device, the method comprising:
   generating at least one beam, a region to be scanned being scanned by the at least one beam, and at least one beam reflected by an object being guided onto a detector by at least two mirrors rotatable about an axis of rotation;
wherein as a function of an angular position of the at least two mirrors, reflected beams are transmitted by a first mirror onto at least one second mirror and reflected by the at least one second mirror onto the detector, or are reflected by the first mirror onto the detector, and
wherein the lidar device includes:
   at least one radiation source for generating the at least one beam;
   the at least two mirrors rotatable about the axis of rotation to deflect beams reflected by an object onto the detector oriented perpendicularly to the axis of rotation;
   wherein the at least two mirrors have, in each instance, a reflectivity for a wavelength range and are connectable to each other at an angle, in a region of the axis of rotation;
   wherein the at least two mirrors have a reflectivity on both sides for, in each instance, one wavelength range.

\* \* \* \* \*